(12) United States Patent
Quincke et al.

(10) Patent No.: US 7,077,743 B2
(45) Date of Patent: Jul. 18, 2006

(54) METHOD OF AND DEVICE FOR DETERMINING CROP PARAMETERS

(75) Inventors: Gunnar Quincke, Soest (DE); Hubert Buhne, Sendenhorst (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/781,090

(22) Filed: Feb. 17, 2004

(65) Prior Publication Data

US 2004/0200200 A1   Oct. 14, 2004

(30) Foreign Application Priority Data

Feb. 17, 2003  (DE) ................. 103 06 725

(51) Int. Cl.
*A01D 75/18* (2006.01)
*A01F 12/16* (2006.01)
*A01F 21/00* (2006.01)

(52) U.S. Cl. ................. 460/7; 460/114; 73/73
(58) Field of Classification Search ............. 56/10.2 R, 56/10.2 B, 16.4 D; 460/1, 7, 22, 114; 73/73
See application file for complete search history.

(56) References Cited

U.S. PATENT DOCUMENTS

| | | | |
|---|---|---|---|
| 1,870,240 A * | 8/1932 | Domaica ................. 198/307.1 |
| 3,270,279 A | 8/1966 | Jackson |
| 3,293,907 A * | 12/1966 | Schnatz et al. ................. 73/73 |
| 3,890,830 A * | 6/1975 | Dyck ............................. 73/73 |
| 4,034,543 A * | 7/1977 | Voth et al. ..................... 56/341 |
| 4,403,191 A * | 9/1983 | Satake ......................... 324/452 |
| 5,092,819 A * | 3/1992 | Schroeder et al. ............. 460/7 |
| 5,327,708 A * | 7/1994 | Gerrish ............................ 56/1 |
| 5,795,221 A * | 8/1998 | Diekhans ........................ 460/6 |
| 5,913,801 A * | 6/1999 | Bottinger et al. ......... 56/10.2 R |
| 5,957,773 A * | 9/1999 | Olmsted et al. ................ 460/7 |
| 6,098,454 A * | 8/2000 | Ghorashi et al. ............. 73/160 |
| 6,119,531 A * | 9/2000 | Wendte et al. ............ 73/863.52 |
| 6,155,103 A * | 12/2000 | Diekhans et al. ............... 73/73 |
| 6,327,899 B1 * | 12/2001 | Diekhans et al. ............... 73/73 |
| 6,401,549 B1 * | 6/2002 | Ohlemeyer ............... 73/861.73 |
| 6,431,981 B1 * | 8/2002 | Shinners et al. ............... 460/6 |
| 6,669,557 B1 * | 12/2003 | Adams et al. ................. 460/7 |
| 2004/0063478 A1* | 4/2004 | Kommann et al. ............ 460/1 |

FOREIGN PATENT DOCUMENTS

EP       0 931 446 A1    7/1999

* cited by examiner

*Primary Examiner*—Árpád Fábián Kovács
(74) *Attorney, Agent, or Firm*—Michael J. Striker

(57) ABSTRACT

A method of determining crop parameters in an agricultural harvester has the steps of determining at least one crop parameter during a working process with a compacting device which is fillable with a crop probe, and using for determining the at least one crop parameter of the crop probe depending on at least one defined compression of the crop probe produced by the compacting device.

19 Claims, 1 Drawing Sheet

METHOD OF AND DEVICE FOR DETERMINING CROP PARAMETERS

BACKGROUND OF THE INVENTION

The present invention relates to a method of and device for determining crop parameters in an agricultural harvester, with a compacting device which is fillable with a crop probe during the working process.

It is known to determine crop parameters, such as for example the dry mass content, the product moisture, the albumin content, the protein content and the like stationarily with a product probe in devices in laboratories. There is however an increasing demand to perform the determination of the crop parameter in a continuous working operation of the harvester directly and fast. It is known to use for this purpose sensors on harvesters for determination for example of the crop moisture during the working operation. The utilized sensors supply for the measuring process a product probe branched from the crop stream. Furthermore, the utilization of contactlessly operating sensors or also of sensors which are introduced directly in the crop stream are known as well.

European patent document EP 0 931 446 A1 discloses a measuring device for determination of crop and/or feed-specific parameters on an agricultural harvester. A measuring device is arranged along the feed path inside the harvester, it directly engages in the crop stream and from the direct contact with the transported crop determines a parameter of the crop, for example the product moisture. The crop stream acts directly on the sensor elements of the measuring device, whereby a throughput-dependent contact force of the crop on the sensor elements is produced. The determination of a parameter by means of the proposed measuring device is therefore strongly influenced in dependence on the crop throughput. A precise and reliable determination of parameters is not possible.

SUMMARY OF THE INVENTION

Accordingly, it is an object of the present invention to provide a method of and device for determining crop parameters which avoids the disadvantages of the prior art.

More particularly, it is an object of the present invention to provide a method of and device for determining crop parameters, which provide a reliable and accurate determination of crop parameters in a continuous harvesting operation of the harvester.

In keeping with these objects and with others which will become apparent hereinafter, one feature of the present invention resides, briefly stated in a method of determining crop parameters in an agricultural harvester with a compacting device, comprising the steps filling the compacting device during a working process with a crop probe; and determining at least one crop parameter of the crop probe depending on at least one defined compression of the crop probe produced by the compacting device.

When the method is performed in accordance with the present invention, for the measurement of at least one crop parameter in a compacting device, a homogenous crop probe is produced by a definite precompaction. The measurement of at least one crop parameter is advantageously performed in reproducible measuring conditions. In particular, the variables, such as density deviations as well as different crop structures which influence the known measuring devices in the harvester are advantageously excluded and respectively detected, and an accurate and respectively reliable determination of the crop parameters is possible. With the definite compression, air inclusions in particular in the bulky crop are reduced to a minimum.

In accordance with a first embodiment of the present invention, the compacting device includes at least one movable compacting element and the defined compression of the crop probe is determined on the basis of the compacting force introduced by the compacting element into the crop probe. A compacting device formed in this way allows a simple, cost-favorable construction as well as utilization of known means for compacting and for determination of the defined compression of the crop probe. In particular with the at least one movable compacting element, an active transporting of the crop and an active cleaning of the compacting device is possible inside the compacting device.

The defined compression which is introduced by the compacting element into the crop probe to be compacted, is advantageously adjustable depending on the crop to be sensed. Thereby the defined compression force and the compacting force introduced in the crop can be adapted to different crops, for example to the different crop structures with different lengths of cut. A reproducible and homogenous crop probe in the compacting device can be produced for example in connection with the different crops, wherein in particular disturbing air inclusions can be excluded.

In a special further embodiment of the invention, the at least one crop parameter is the volume of the crop probe. With the defined compression of the crop probe, hollow spaces, such as for example air inclusions, are excluded to a great extent and the determined volumes of the crop probe represent thereby a representative comparable of the crop probe. For example the mass of crop probe can be determined once, and with the same crop art and crop structure, on the basis of the determination of the volume, the mass of further crop probes can be determined. The volume thereby allows a standardization of further determination or correction of further crop parameters in the harvester.

In a further embodiment of the present invention, the at least one crop parameter is the mass of the crop probe. The determined mass serves in an advantageous manner for the correction of a further crop parameter of the crop probe or the crop, which depends on the mass. The mass is advantageously readily available for further utilization in further devices of the harvester and allows, in connection with the known volume of the crop probe, in accordance with a further embodiment of the present invention the calculation of the density of the crop probe. From the determined density, it is advantageously possible to determine the comminuting action of the chopper device in the harvester. On the basis of the comparison of the actual crop product density with a preliminarily measured and stored density of further crop probes, crop properties as well as the working output of the chopper device of the harvester can be monitored. Advantageously, a worsening of the comminuting action of the chopper device can be derived from a reduction of the density of the crop probe.

The at least one harvesting parameter, in accordance with a further embodiment of the present invention, is a moisture value of the crop probe, wherein it is corrected on the basis of the density of the crop probe. By the compacting of the crop probe in the compacting device to a definite compression, advantageously a defined contact force of the crop probe acts on a moisture sensor. Thereby a calibration of the moisture sensor can be performed, as well as measuring outputs can be obtained which are comparable with one another. Furthermore, in connection with the determination of the density of the crop probe, a correction is possible in particular of the volume-dependent moisture value of a capacitive moisture sensor. The sensitive moisture value can be standardized on the basis of the volume of the crop probe. The successful use of a capacitive moisture sensor on a harvester with usable measuring outputs is possible for the first time.

In a further embodiment of the invention, a parameter which is in connection with the crop probe can be utilized, such as for example compression, volume, mass, density or moisture of the crop probe and/or of the crop for correction or determination of at least one further crop parameter determined in the harvester. The parameter of the crop probe or of the crop determined by the taking of the crop probe in connection with the compacting device can be advantageously detected by known sensors and used for further devices in the harvester. The expenses for special sensor devices for the determination of crop parameters in a harvester can be thereby reduced.

In accordance with a further embodiment of the present invention, it is proposed to provide in the harvester a yield measuring device and to obtain the crop throughput and/or crop yield determined by the yield measuring device with consideration of the determined density of the crop probe. The yield determination on the harvesters deals also with a determination of the throughflowing crop volume. A conversion to the crop mass was performed until now on the basis of the fixedly determined crop density. The automatic determination of the density and taking it into account during the yield determination brings an enormous improvement of the accuracy of the yield measuring system and avoids further manual fine adjustments of the system. Furthermore, the required manual calibration works of an operator on the yield measuring system are advantageously reduced to a minimum.

In accordance with a further embodiment of the invention, the agricultural harvester is a forage harvester with at least one feed roll and at least one deflectably supported compression roll and contains at least one spring for compacting of the crop transported between the at least one feed and compression rolls, wherein on the basis of the deviation of the at least one compression roll the crop throughput is determined by the harvester, while during the compacting process of the crop probe in the compacting device, the contacting force and the associated volume of the crop probe are determined, at least one ratio between the compacting force and the volume is determined, and the at least one ratio during the determination of the crop throughput is considered. The compression of the crop in the pulling in aggregate of a forage harvester is dependent on the crop throughput-dependent deviation of the compression roll. This deviation counteracts at least one spring and thereby effects a different compacting of the crop depending on the deviation. Furthermore, the deviations of the compression roll by different crop types as well as crops with different crop structures is influenced by the compacting which is differently produced by the pre-compression roll.

From the running compacting process of the crop probe, a ratio between the volume and compacting force can be generated. This ratio is advantageously used for correction and respectively standardization of the determined crop throughput and leads to an improvement of the accuracy of the crop throughput determination.

In accordance with a special embodiment of the present invention, during the filling of the compacting device, the compacting element performs an oscillating movement with a small compacting action, until a defined compression of the crop probe is obtained. This filling process allows advantageously, before each final compacting of the crop probe to a defined compression, to provide a substantially identical filling of the compacting device. It is further guaranteed that also different crops with different transporting properties are supplied into the compacting device in a sufficient quantity.

The objective of the present invention is further to provide a device which is characterized in that at least one sensor is available for determination of a defined compression of the crop probe located in the compacting device.

With this sensor advantageously the compression can be monitored, so that the homogenous crop probes can be produced with the same compaction. The crop parameters are then determined under the same measuring conditions and thereby are advantageously comparable.

In an embodiment of the invention, the compacting device is composed of at least one probe chamber and a compacting piston which is movable in it, and the compacting force applied by the compacting piston is determined by at least one pressure sensor. The use of the compacting piston in a probe chamber for producing the defined compression allows to use a course-favorable adjusting drive for movement of the compacting element. Furthermore, known sensors can be used for detecting of the defined compression. The value of the compacting force which is applied by the compacting piston to the crop probe is advantageously sensed by a pressure sensor, wherein the pressure value then is a representative measure for the compression compacting of the crop probe in the compacting device. Such pressure sensors are known in the drives for compacting pistons, to where they can be advantageously referred to. Often such pressure sensors are integrated in series in the drives, or their incorporation is provided optionally.

In accordance with a further embodiment of the present invention the position of the compacting piston in the probe chamber is detected by at least one position sensor. On the basis of the determined position, advantageously the volume of the crop probe available in the probe chamber can be calculated in connection with the known measurements of the probe chamber. An available probe control can be further determined on the basis of the sensed compacting piston position, whether the opening for filling of the probe chamber is open or closed and the filling process is differentiated from a compacting process. Furthermore, on the basis of the known position of the compacted piston in the probe chamber, the relation between the volume and the compression of the crop probe is monitored by the probe control and during the compacting process is recorded in a storage device.

In accordance with a special embodiment of the present invention, the crop probe is supplied directly through an opening from the crop stream harvester into the compacting device. Susceptible to faults in the intermediate conveyors can be therefore completely dispensed with, whereby a continuous availability of the device in the working operation is guaranteed.

The agricultural harvester is advantageously a forage harvester with a chopper drum bottom which is located on it and deviates the product, and the opening is arranged in the product-deviating drum bottom. In a chopper drum of a forage harvester an active transportation of the crop is provided by the rotatable knife. The arrangement of the opening on the product-deviating bottom drum provides a secure withdrawal of the crop from the chopper drum. The product deviation to the opening remaining during the withdrawal of the crop probe is used for transporting the crop probe into the probe chamber. In connection with the active transporting in the chopper drum, it is advantageous to provide a continuous post-transporting to the opening as well as a cleaning of the withdrawal position. A remaining disturbance of the product stream as well as a product accumulation by the crop probe withdrawal is excluded by the advantageous position of the opening. These advantageous are also provided when the agricultural harvester is a combine harvester with a straw chopper and a product deviating guiding bottom located on it, and the opening is arranged on the product-deviating guiding bottom.

In accordance with a further embodiment of the present invention, the crop probe is guided from the compacting device in the crop stream of the harvesting machine by the movable compacting element. The crop probe goes through here without losses and leaves behind a clean operating field.

In accordance with a further embodiment of the present invention, the crop chamber and the movement device of the compacting piston are oriented substantially in the transporting direction of the crop in the region of the opening. Thereby buildups and an intense product deviation during the filling of the probe chamber and the available movement of the crop is advantageously utilized for filling of the probe chamber. Furthermore, a simple flat construction is provided.

The novel features which are considered as characteristic for the present invention are set forth in particular in the appended claims the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
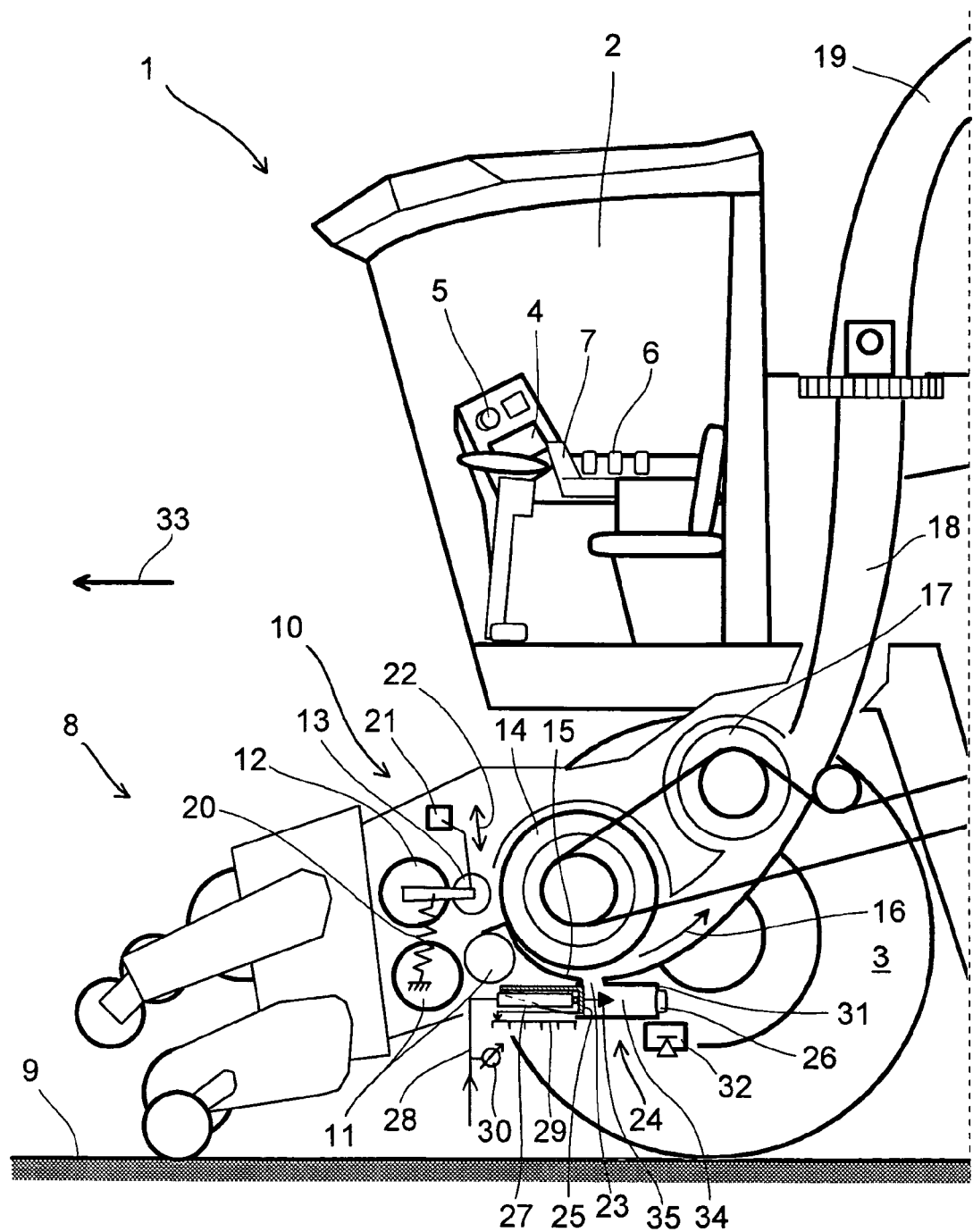
FIG. 1 is a view schematically illustrating a method and a device for determining crop parameters in accordance with the present invention.

The present invention is illustrated in FIG. 1. FIG. 1 shows a front part of a side view of a forage harvester 1 as considered in a traveling direction 33, with a driver cabin 2 and a shown drive tire 3. An indicating device 4 and an at least one adjusting device 5 as well as further operating elements for the operation of the forage harvester, such as a switch 6 and a drive lever 7, are arranged in the driver cabin 2.

The shown forage harvester is provided with a front attachment 8 with which the forage harvester 1 takes a not shown crop from a field bottom 9 and supplies it to the subsequent feed aggregate 10 over its width. Two driven lower feed rollers 11 and two driven upper movably supported compression rolls 12 and 13 are arranged in the feed aggregate 10. The crops supplied by the feed aggregate 10 is compressed between the feed rolls 11 and the compression rolls 12 and 13 by a force produced by at least one spring 20 on the compression rolls 12 and 13, and then is transferred to the subsequent chopper drum 14. The rotatable chopper drum 14 chops the crop and actively transports it along the drum bottom 15 in the transporting direction 13 to a subsequent accelerator 17. The crop is accelerated there and loaded into a not shown transporting container through a discharge chute 18 and a subsequent chute extension 19.

The shown forage harvester 1 is provided with a yield measuring device which is known for a person skilled in the art. In FIG. 1 the gap sensor 21 for determination of a distance between the rear feed roll 11 and the rear compression roll 13 is shown. The deviation 22 of the compression roll 13 produced by the compression crop layer is taken into consideration by a not shown evaluating device in connection with the width of the feed aggregate 10 and the crop speed to determine a crop throughput volume. From the transported crop volume, in connection with the density of the crop, a crop throughput in t/h can be calculated.

An inventive compacting device 24 which operates in the accordance with the inventive method is arranged on the drum bottom 15. An arrangement of the compacting device 24 on a guide bottom of a straw chopper in a combine harvester is within the frame of the invention and does not need any further illustration for direct use by a person skilled in the art. Furthermore, it is within the frame work of the invention when the filling of the compacting device 24 is manually released or performed during the working process.

The shown compacting device 24 contains a compacting piston 25 which is movably arranged in a probe chamber 34. The probe chamber 34 is oriented in the traveling direction 33 of the forage harvester 1 which substantially corresponds to the orientation of the crop stream along the drum bottom 15, while the transporting direction 16 of the crop is opposite to the traveling direction 33. The compacting-/and movement direction of the compacting piston 25 inside the probe chamber 34 corresponds to the orientation of the probe chamber 34 in correspondence with the structure.

The drum bottom 15 is oriented so as to deviate the product and has an opening 23. In working operation of the forage harvester 1 the probe chamber 34 is filled with the chopped crop through the opening. The opening 23 is opened by the compacting piston 25 in the shown position for withdrawing a crop probe from the chopper drum 14. Through the opening 23 the crop which is chopped by the chopper drum 14 is supplied by the crop deviation remaining in the region of the opening 23, the acting centrifugal force and the active transportation through the chopper drum 14 directly into the probe chamber 34.

By a movement of the compacting piston 25 in connection with the shown construction of the compacting piston 25, in direction to the sensing device 26 arranged on the opposite end of the probe chamber 34, the opening is closed after a certain time. A separate, controlled slider on the opening 23 as well as an intermediate transporting means for filling of the probe chamber 34 are within the frame of the invention and are determined by it. Further, the opening 23 can be arranged also in the active transporting region of the post-accelerator 17. The movement of the compacting piston 25 inside the probe chamber 34 is performed by a controlled stroke cylinder 27 which is used here. A known electro-hydraulic control device which is not shown but known for a person skilled in the art, activates, on command of a further not shown secondary probe control through the schematically shown conduit 28, the supply of an oil quantity to the stroke cylinder 27 and therefore provides a movement of the compacting piston 25 from the shown rear end position. The position of the compacting piston 25 in the probe chamber 34 is detected by a position sensor 29 and inquired by the probe control. On the basis of the position of the compacting piston 25 in the probe chamber 34, in connection with the known measurements of the probe chamber 34, for each position of the compacting piston inside the probe chamber 34 a volume of the crop probe can be determined.

The determination of the compression of the crop probe can be performed by at least one suitable sensor which is known for a person skilled in the art, for example by a pressure-/force-/ or density sensor. The sensor can be arranged in the probe chamber 34 or formed for example by the sensor device 26. In the shown FIG. 1 the pressure produced in the conduit 28 is detected by a pressure sensor 30 and recorded in the probe control. On the basis of the sensed pressure, the compacting force 35 introduced in the crop probe is then representative for the defined compression of the crop probe. The sensors 30 can be arranged further on the compacting piston 25 or on the stroke cylinder 27 or on its supply conduit 28.

The probe control is further connected with the adjusting device 5, the indicating device 4, and at least one switch 6 in the driver cabin 2. Thereby the activation of the probe withdrawal is carried out, and the guideline of a crop type and respectively the position of the compacting piston 25 for the subsequently clarified shortened stroke of the compacting piston 25 and the respectively the emptying stroke or the threshold value for the filling- and defined compression can be adjusted.

In accordance with the present invention threshold values for different compacting can be adjusted by the adjusting device 5 or selected from a storage device, so that the compacting device 24 can be adapted to different crops and their compacting properties. For avoiding air inclusions and for obtaining a homogenous crop probe, bulky crops, such as long or old grass as well as straw are compressed to a greater defined compacting force 35.

The actual process course and the adjusted as well as determined parameter of the probe withdrawal and respectively the crop probe can be visualized by the operator of the forage harvester 1 on via indicating device 4.

The inventive course of the determination of a crop parameter is controlled automatically by the probe control. On the basis of the position of the compacting piston 25 indicated by the position sensor 29 a filling of the probe chamber 34 with crop is recognized. For this purpose the probe control of this position of the compacting piston 25, after for example a manual activation of the crop withdrawal by the switch 6, can be carried out first automatically. During the filling in accordance with the present invention it is provided that the compacting piston 25 performs a shortened stroke oscillatingly. Thereby the crop which is located in the probe chamber 34 under the opening 23 is further pressed into the probe chamber 34 and the opening 23 is released for a subsequent probe. During the shortened stroke of the compacting piston 25 the stroke cylinder 27 is moved by the probe control only to a predetermined position, for example until the opening 23 is closed by the compacting piston 25, and then moves back to the indicated end position. During the clearing the filling compacting is monitored by the probe control on the basis of the compacting force 35 introduced in the available crop probe. If during the shortened stroke a compacting force 35 is above a predetermined threshold value, the filling process is ended. Now a crop probe which is sufficiently compacted for the determination of the crop parameter is located in the probe chamber 34.

It is to be understood that during the filling process of the probe chamber 34 a smaller threshold value (filling compacting) is preselected for the compacting force 35 than during the subsequent final compacting of the crop probe to the defined compression. The stroke cylinder 27 in accordance with the present invention is now controlled for further compacting of the crop probe by the probe control and the compacting piston 25 is moved in the probe chamber 34, until the defined compression is introduced in the crop probe for example by a second threshold value in the probe control by a compacting force 35 provided in the probe control.

During the compacting process the probe control continuously determines the position of the compacting piston 25 and respectively the volume of the crop probe and the compacting force 35, and stores in a storage located in the probe control as value pairs. From the recorded measuring values the ratio between the volume of the crop probe and the compacting force 35 is determined and provides a corresponding characteristic line. Since the volume of the compressed crop probe in the probe chamber 34 is not the same after each crop probe withdrawal, the recorded characteristic line is correspondingly standardized to a ratio value or a predetermined compacting. Thereby a comparison of characteristic lines and a reading of correction factors is possible.

The different properties, such as crop moisture or crop structure, the crops as well as the use of the harvester on different crop types effects a different compacting and thereby different deviations 22 of the compression rollers 13.

For determination of the at least one crop parameter of the crop probe, in the compacting device 24 a sensor device 26 which is available for this purpose is arranged. For example, this sensor device 26 is arranged on the rear wall 21 of the probe chamber 34. This sensor device 26 can be for example a moisture sensor which determines a moisture value of the crop probe by means of the known capacitative measuring process. The value determined by the moisture sensor is determined with reference to the known product volume. For a representative result it is required that the moisture value related to a corresponding probe volume be correspondingly corrected. From the volume of the crop probe located inside the probe chamber 34 determined in accordance with the present invention, a corresponding correction of the moisture value determined by the moisture sensor is possible.

The mass of the crop probe can be determined as a crop parameter of the crop probe. For this purpose a weighing device 32 is arranged after the probe chamber 34. The crop probe for determination of the mass of the crop probe is transferred through a rear wall 31, which is automatically opened by the probe control and by a further stroke of the stroke cylinder 27 with the compacting piston 25, into the weighing device 32. It is within the framework of the invention to use the compacting device 24 for determination of the volume and to determine a further crop parameter subsequently by a further device, as shown here, by the weighing device 32. The probe chamber 34 can be formed as the weighing device 32 or can contain the weighing device 32. For this purpose the whole probe chamber or a part of the probe chamber 34 with the crop probe located in it is weighed. After the compacting the rear wall 31 of the probe chamber is open and the crop probe is expelled by the compacting piston 25 from the probe chamber 34 to the field bottom 9. The crop probe can be further transferred back by a further not shown shaft to the crop stream. For this purpose a piston/cylinder unit can move back the crop probe through a further opening, for example in the discharge chute 18, to the crop stream. With the corresponding design of the stroke cylinder 27 with an expanding stroke region, the compacting piston 25 can transport the crop probe from the probe chamber 34 into the existing crop stream in the forage harvester 1.

The individual crop parameters determined in accordance with the present invention can be detected by a known yield mapping, and in particular in connection with a navigated position of the harvester indicated in the storage means.

Based on the determined mass of the crop probe, and in connection with the moisture determined with it, a water mass in the crop probe can be calculated. The exact percent of moisture of the crop probe can be determined from this. Furthermore, the determination of the dry mass content of the crop probe is now possible. In connection with the known mass and the known volume of the crop probe, the density of the crop probe can be determined. This density in accordance with the present invention makes possible a direct calculation and respectively a correction of the volume-dependent moisture value in the water mass content of the crop probe. Furthermore, the determined density can be used in a yield measuring device, which is based for example on a sensed volume value, for calculation of the crop throughput and respectively the yield value.

In accordance with the present invention the compacting device 24 and the associated sensors 30 as well as the at least one sensor device 26 can be coupled through known connecting- and data transmitting devices with the probe control and the further devices such as for example the devices 4, 5, 6, 7, in the driver cabin 2. The individual determined crop parameters determined in accordance with the present invention can be exchanged through them, and to further devices in the harvester for further use.

Furthermore, it is believed to be clear for a person skilled in the art that the presented examples can be used on harvesters which are not mentioned here and designed further with alternatively used and respectively further known sensor devices. The invention is not limited to the compacting technique which is shown in the example and uses a piston/cylinder device. Within the framework of the invention the crop probe can be brought to a predetermined compression by other compacting techniques which are known for a person skilled in the art, such as for example with a screw compactor.

It will be understood that each of the elements described above, or two or more together, may also find a useful application in other types of methods and constructions differing from the types described above.

While the invention has been illustrated and described as embodied in a method and device for determining crop parameters, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

The invention claimed is:

1. A method of determining crop parameters in an agricultural harvester with a compacting device, comprising the steps of taking a crop by the agricultural harvester; transporting the crop in a transporting direction during a working process by transporting means; deviating from the transporting means a crop probe during the working process to the compacting device which is a separate device located outside the transporting means; filling the compacting device during the working process with the deviated crop probe; compacting the crop probe in the compacting device with at least one defined compression for avoiding air inclusions and obtaining a homogenous crop probe; and determining at least one crop parameter of the crop probe depending on the at least one defined compression of the crop probe produced by the compacting device located outside the transporting means.

2. A method as defined in claim 1, wherein the compacting device has at least one movable compacting element; and further comprising determining the defined compression of the crop probe on a basis of a compacting force which is introduced by the compacting element into the crop probe.

3. A method as defined in claim 1; and further comprising adjusting the defined compression depending on the crop to be sensed.

4. A method as defined in claim 1, wherein said determining at least one crop parameter includes determining a volume of the crop probe.

5. A method as defined in claim 1, wherein said determining at least one crop parameter includes determining a mass of the crop probe.

6. A method as defined in claim 1; and further comprising determining, from a volume and a mass of the crop probe, a density of the crop probe.

7. A method as defined in claim 1; and further comprising using as the at least one crop parameter a moisture value of the crop probe; and correcting the moisture value on a basis of a density of the crop probe.

8. A method as defined in claim 1; and further comprising using a parameter which is connected with the crop probe for a step selected from the group consisting of a correction and a determination of at least one further crop parameter determined in the harvester.

9. A method as defined in claim 8; and further comprising using as the parameter connected with crop probe a parameter selected from the group consisting of a crop probe parameter, a crop parameter and both, and further selected from the group consisting of a compression, a volume, a mass, a density and a moisture.

10. A method as defined in claim 1; and further comprising providing in the harvester a yield measuring device; and determining by the yield measuring device a parameter selected from the group consisting of a crop throughput, a crop yield, and both with consideration of a determined density of the crop probe.

11. A method as defined in claim 1, wherein the agricultural harvester is a forage harvester with at least one feed roll and a deflectably supported compression roll, and at least one spring for compacting the crop transported between the at least one feed roll and the compression roll; and further comprising determining on a basis of a deviation of the at least one compression roll a crop throughput through the harvester; during a compacting process of the crop probe in the compacting device determining a compacting force and an associated volume of the crop probe; determining at least one ratio between the compacting force and the volume; and taking into consideration the at least one ratio during the determination of the crop throughput.

12. A method as defined in claim 1; and further comprising performing during filling of the compacting device an oscillating movement of a compacting element with a reduced compacting action, until at least a defined compression of the crop probe is obtained.

13. An agricultural harvester, comprising means for taking a crop by the agricultural harvester; means for transporting the crop in a transporting direction during a working process; means for deviating from the transporting means a crop probe during the working process; at least one compacting device which is a separate device located outside of said transporting means and is fillable during the working process with the deviated crop probe and compacting the crop probe with at least one defined compression for avoiding air inclusions and obtaining a homogenous crop probe; and at least one sensor provided for determining the defined compression of the crop probe in the compacting device located outside the transporting means.

14. An agricultural harvester as defined in claim 12, wherein said compacting device has at least one probe chamber and a compacting piston movable in said probe chamber, so that a compacting force applied by said compacting piston is determined by said at least one sensor formed as a pressure sensor.

15. An agricultural harvester as defined in claim 13; and further comprising a position sensor for detecting a position of a compacting piston in said compacting device.

16. An agricultural harvester as defined claim 13; and further comprising means forming an opening through which the crop probe is supplied directly from a crop stream in the harvester to said compacting device.

17. An agricultural harvester as defined in claim 16, wherein said agricultural harvester is a forage harvester provided with a chopper drum and a drum body located on the latter and deviating a product, said opening being formed on said product-deviating drum body.

18. An agricultural harvester as defined in claim 13, wherein said compacting device has a movable compacting element which returns back the crop probe into a crop stream of the harvester.

19. An agricultural harvester as defined in claim 14, wherein said probe chamber and a movement direction of said compacting piston are oriented substantially in a transporting direction of the crop in the region of an opening through which the crap probe is supplied from a crop stream.

* * * * *